United States Patent [19]
Bland et al.

[11] Patent Number: 5,732,218
[45] Date of Patent: Mar. 24, 1998

[54] MANAGEMENT-DATA-GATHERING SYSTEM FOR GATHERING ON CLIENTS AND SERVERS DATA REGARDING INTERACTIONS BETWEEN THE SERVERS, THE CLIENTS, AND USERS OF THE CLIENTS DURING REAL USE OF A NETWORK OF CLIENTS AND SERVERS

[75] Inventors: M. Alan Bland; Vladimir Nepustil, both of Boulder, Colo.

[73] Assignee: Lucent Technologies Inc., Murray Hill, N.J.

[21] Appl. No.: 778,126

[22] Filed: Jan. 2, 1997

[51] Int. Cl.$^6$ .................................................. G06F 11/34
[52] U.S. Cl. .............................. 395/200.54; 395/200.59
[58] Field of Search .......................... 395/200.01, 200.05, 395/200.03, 200.08, 200.09, 200.12, 610, 615, 182.02, 182.18, 184.01, 200.31, 200.33, 200.49, 200.53, 200.54, 200.56, 200.57, 200.58, 200.59

[56] References Cited

U.S. PATENT DOCUMENTS

| | | | |
|---|---|---|---|
| 4,849,879 | 7/1989 | Chinnaswamy et al. | 395/60 |
| 5,086,386 | 2/1992 | Islam | 395/618 |
| 5,303,166 | 4/1994 | Amalfitano et al. | 364/551.01 |
| 5,371,889 | 12/1994 | Klein | 395/676 |
| 5,455,947 | 10/1995 | Suzuki et al. | 395/620 |
| 5,459,837 | 10/1995 | Caccavale | 395/184.01 |
| 5,537,542 | 7/1996 | Eilert et al. | 395/184.01 |
| 5,544,303 | 8/1996 | Maroteaux et al. | 395/161 |
| 5,544,359 | 8/1996 | Tada et al. | 395/618 |
| 5,553,235 | 9/1996 | Chen et al. | 395/182.18 |
| 5,584,025 | 12/1996 | Keithley et al. | 395/615 |

OTHER PUBLICATIONS

Netspeak's Hot Internet Sun Product, Computer Telephony, vol. 5, Issue 8, Aug. 1996, pp. 120–124.

Aspect Telecomunications—Press Release, San Jose, CA, Aug. 5, 1996, 4 pages.

E. Mier, A server health plan, Network World, vol. 13, No. 32, Aug. 5, 1996, pp. 41–44.

An Introduction to DEFINITY® Communication System, Generic 3 V2, 555–230–023, Issue 1, May 1993, pp. 43–45.

B. Schultz, Documenting the Xerox-Wide Web, Intranet Magazine, Jul. 1996, pp. 35–38.

J. Duffy, HP users say Tornado packs plenty of punch, Network World, vol. 13, No. 15, Apr. 8, 1996, p. 10.

M. Cooney, IBM/Trivoli begin planning for future management wares, Network World, vol. 13, No. 13, Mar. 25, 1996, pp. 14–15.

S. Kalin, IBM digs into data mining, Network World, vol. 13, No. 16, Apr. 15, 1996, p. 29.

(List continued on next page.)

Primary Examiner—Parshotam S. Lall
Assistant Examiner—Viet Vu
Attorney, Agent, or Firm—David Volejnicek

[57] ABSTRACT

In an information network of clients (101–102) and servers (103–104), a service management system (122) of a server gathers data from the server and from the clients for managing an information service. Information management data is gathered on a client by extensions (131) to a browser (130) and is periodically reported to the service management system. Data gathered on the server includes: number of page accesses per unit of time, durations of delays between receipt of client requests for information and the server responses thereto, number of accesses to each accessed page from each referring page, number of page accesses per browser type, processor and mass-storage occupancy of the server, and configuration details of each accessing browser. Data gathered on the client includes: durations of delays between the client placing a request and a server's response to the request, the amount of time that a particular object is active at the client, abandon count and time, click-ahead count and time, and client demographics. The service management system uses the gathered data to generate reports for a manager of the information service.

18 Claims, 2 Drawing Sheets

OTHER PUBLICATIONS

J. Duffy, Frontier enhances WAN, Web, Network World, vol. 13, No. 29, Jul. 15, 1996, p. 19.

T. Greene, Sahara puts Java to management test, Network World, vol. 13, No. 7, Feb. 12, 1996, p. 1, 72.

E. Horwitt, et al., When it comes to net management, users are hard to please, Network World, vol. 13, No. 15, Apr. 8, 1996, pp. 45–47.

J. Cohen, 3Com tries to move ahead in RMON race, Network World, vol. 13, No. 31, Jul. 29, 1996, p. 31.

B. Heskett, LAN management vendors go after the enterprise market, Network World, vol. 13, No. 13, Mar. 25, 1996, p. 39.

G. Hankovic & L. Black, Engineering a Web Site, (sub title: On the track of the user), IEEE Spectrum, vol. 33, No. 11, Nov. 1996, p. 68.

getstats.c, version 1.2, Internet, Aug. 25, 1995, 12 pages.

B. Davis, Trio Debuts Web–Site Analysis Tools, CommunicationsWeek, No. 634, Oct. 21, 1996, pp. 45–46.

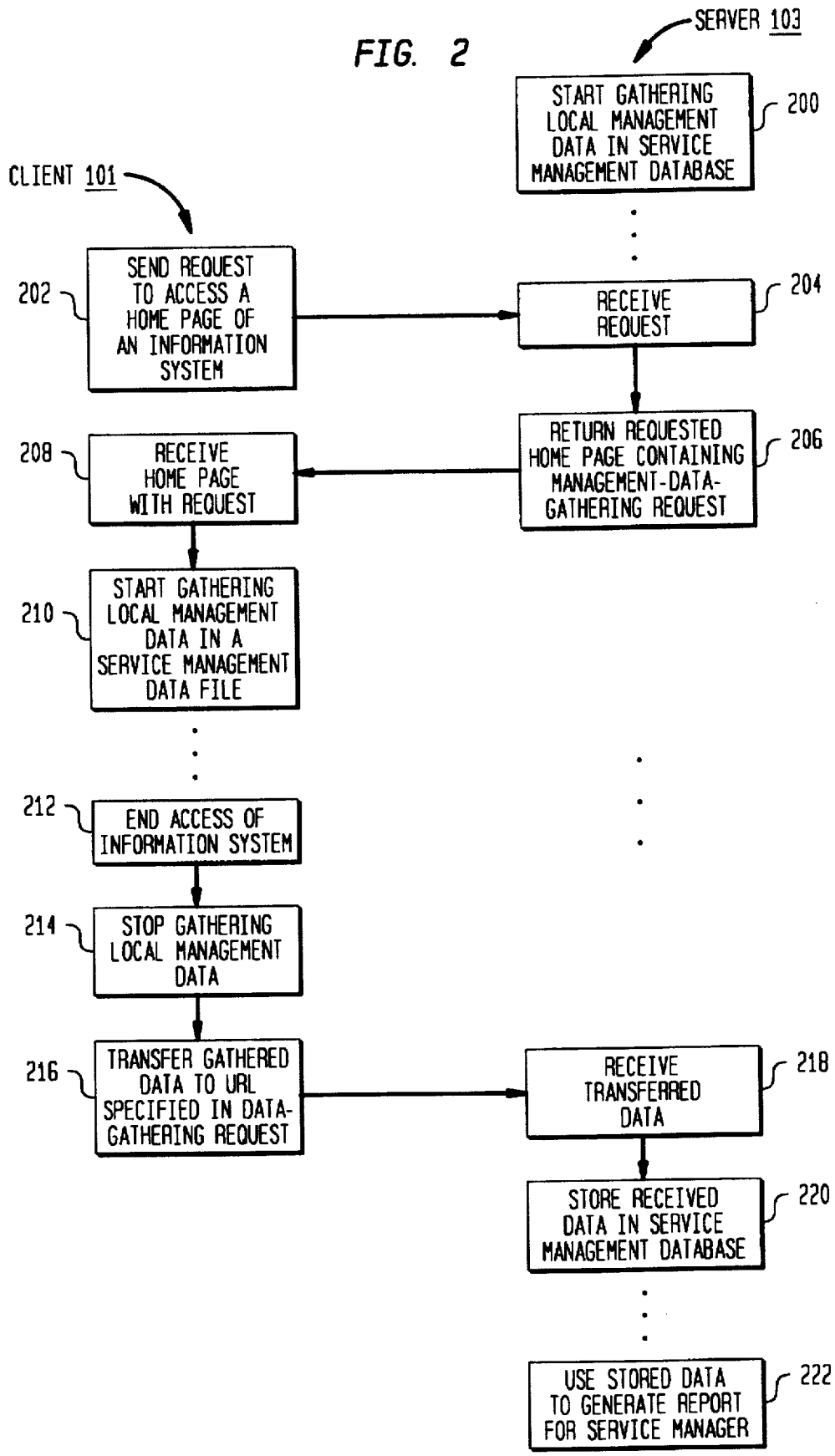

MANAGEMENT-DATA-GATHERING SYSTEM FOR GATHERING ON CLIENTS AND SERVERS DATA REGARDING INTERACTIONS BETWEEN THE SERVERS, THE CLIENTS, AND USERS OF THE CLIENTS DURING REAL USE OF A NETWORK OF CLIENTS AND SERVERS

TECHNICAL FIELD

This invention relates to information networks and to management systems for such networks.

BACKGROUND OF THE INVENTION

In an information network, such as the Internet, user's computers, referred to as clients, request information from information-providers' computers, referred to as servers, and the servers supply the requested information to the clients. In the World Wide Web (WWW), which is a de-facto standard for storing, finding, and transferring information on the Internet, the information is supplied in the form of pages. A page is a display screen-full of information expressed in textual, graphical, scriptural, and/or other form. A page comprises one or more information objects. An object is an information element that has its own network address—preferably a unique single address—called a URL (Uniform Resource Locator). For example, a page may comprise one or more text objects, one or more picture objects, and one or more script objects that are presented on the display screen in a layout defined by a frame object.

Typically, a server has a main page that serves as the entry point to the information and services that the server provides. This page typically points to other pages and to objects (e.g., graphic images, video/audio/text files, etc.), which are served either by the same server or by other servers.

An information service that is offered via the information network needs to be tuned for optimum performance. The demand for the service generally varies over time (e.g., weekdays vs. weekends, days vs. evenings, seasonally, etc.). In order to manage the service to optimally meet the customer demand, the service provider needs present as well as historical metrics that describe the quality or availability of the service as perceived by the customer. Also, an information service is often used at least in part for advertising. In order to make their advertisements most effective, advertisers need measurements on how many customers and what types of customers actually view their advertisements and for how long. Advertisers also like to know the demographics of their customers so that they can ensure that the advertisements are reaching desired targets.

To meet demands for service-management information in call centers, call management systems (CMSs) collect call-based statistics, archive them for reference, and generate reports therefrom. Also, Internet servers typically collect statistics such as the numbers of accesses ("hits") per page, and perhaps some other server-based statistics as well. But because call centers handle live calls and rely on human agents to handle the calls, the types of statistics that are collected by CMSs are often either not relevant to, or not sufficiently complete for, automated information networks such as the Internet. And the statistics that are collected by known Web servers are only server-based, rudimentary, and incomplete. Hence, what the information-network art needs in order to better manage such networks is a better management-data collection system.

SUMMARY OF THE INVENTION

This invention is directed to meeting the needs and solving the problems of the art. According to one aspect of the invention, an information-service management system for a client-server information network gathers specific service-management data that are related to interactions between at least one client and at least one server. Data gathered on the server illustratively include at least two of the following: page accesses per unit of time, delay between receipt of client request for information and the supplying of the requested information, number of accesses to a page accessed by the client from each referring page, a number of page units per type of the client's browser, occupancy of a processing unit and a mass storage unit of the server machine, and configuration data of the client's browser. The gathered data are preferably used to generate reports for a manager of the information service to enable the manager to better understand customer needs and responsiveness of the service and to tune the service for optimum performance.

According to another aspect of the invention, the information-service management system gathers service-management data not only from the server, but also from the client. The data is gathered on the client by a management data-gathering arrangement such as extensions to the client's browser. The extension software may either be included in the client along with the browser software, or may be supplied to the client along with a data-gathering request. The arrangement periodically reports the gathered data to the information-service management system. Data gathered on the client illustratively include at least one of the following: delay between the client requesting information and receiving the requested information, an amount of time that an object of the supplied information is active on the client, an abandon count and time of an object of the supplied information on the client, a click-ahead count and time of an object of the supplied information on the client, and demographics of a user of the client. The data gathered on the client is preferably used to supplement and improve the data gathered on the server; the latter data may be incomplete or even misleading. Therefore, gathering data on both the client and the server presents the service manager with a better picture of service performance and allows the service manager to better manage the service.

These and other advantages and features of the invention will become more clear from the following description of an illustrative embodiment of the invention taken together with the drawing.

BRIEF DESCRIPTION OF THE DRAWING

FIG. 2 is a flow diagram of invention-related functions performed by a client and a server of the information network of FIG. 1.

DETAILED DESCRIPTION

Figure 1:
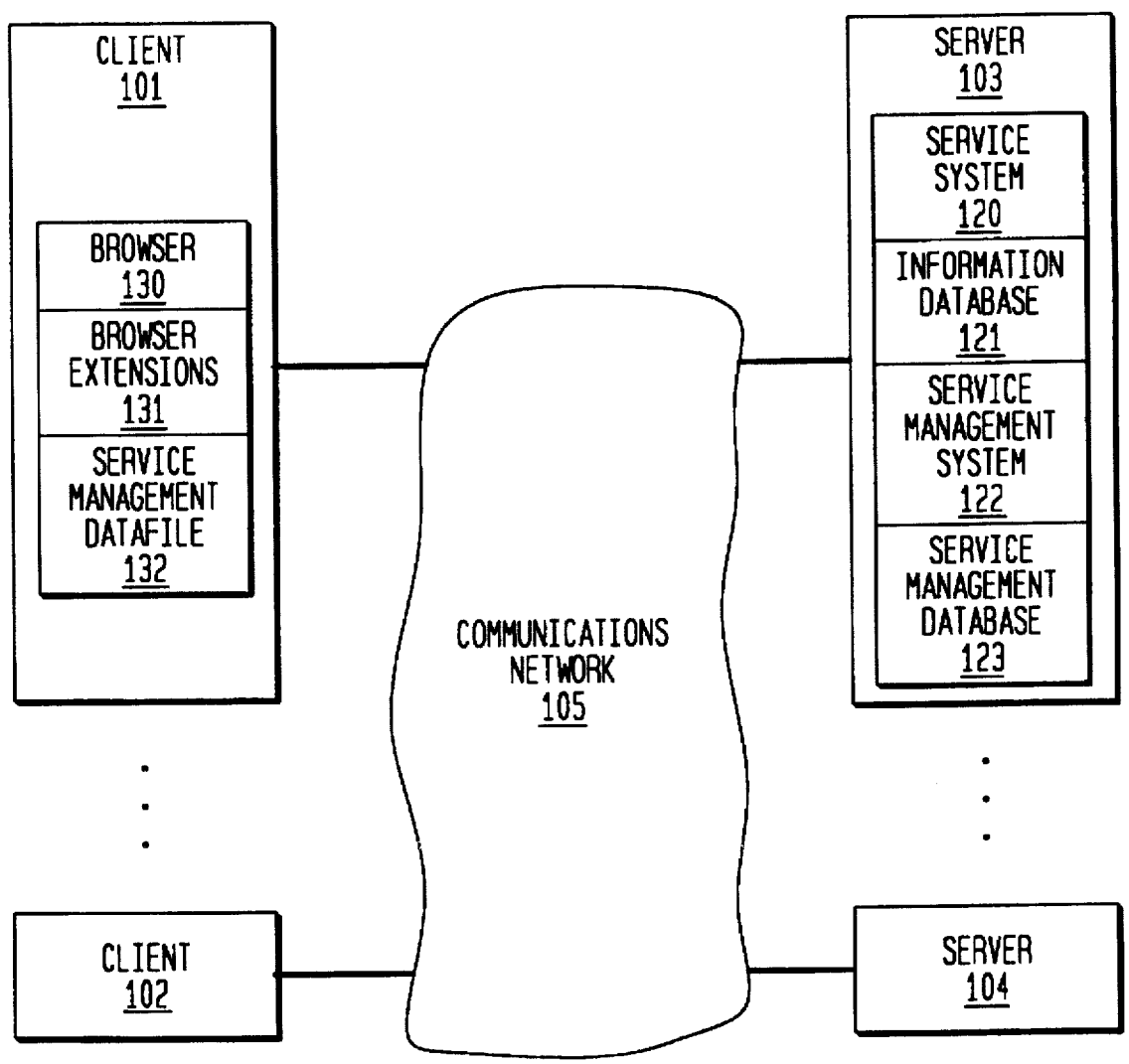
FIG. 1 is a block diagram of an information network that implements an illustrative embodiment of the invention.

FIG. 1 shows an information network that includes an illustrative embodiment of the invention. The information network includes a plurality of client terminals, computers, or other machines referred to generically as clients 101–102, that are interconnected with one or more server computers, systems, or other machines referred to generically as servers 103–104, by a communications network 105. Communications network 105 illustratively comprises the Internet backbone network, Internet gateways and associated intranets, etc., that are collectively generally referred to as the Internet. Units 101–105 together implement the World Wide Web, in a manner well known in the art. Each server 103–104 includes an information database 121, and a service system 120 which is an executing application program that interacts with clients 101–102 to supply them with information from information database 121. Each client 101–102 includes a browser 130 or some other executable client application program through which users of clients 101–102 interact with servers 103–104 to obtain information. As described so far, the information network of FIG. 1 is conventional.

According to the invention, servers 103–104 include a service management system 122 and a service management database 123. System 122 collects service management data on the information service that is provided by information database 121 and service system 120, stores the data in database 123, and generates reports from the stored data for managers of the information service. If each server 103–104 provides a separate and independent information service, generally each server 103–104 includes its own service management system 122 and service management database 123. If servers 103–104 provide either a single information service or a plurality of related services, generally each server 103–104 includes its own local-data gathering and reporting portion of system 122, and one server 103 includes the whole service management system 122 plus service management database 123.

Further according to the invention, at least some and preferably all clients 101–102 each includes extensions 131 to browser 130 that locally gather service management data on the client, store the gathered data in a memory of the client, e.g., in a local service management data file 132, and occasionally report gathered data to service management systems 122 of servers 103–104. The client-gathered data is used by systems 122 to supplement and improve the data that is gathered locally on servers 103–104, which may be incomplete or even misleading. Extensions 131 are preferably associated with browsers 130: they are implemented either as add-on software to conventional WWW browsers, or are integrated into the designs of new browsers or new versions of conventional browsers. The functions of extensions 131 may alternatively be performed by software that is independent of browser 130 and executes on clients 101–102.

Data collected by service management systems 122 locally on each server 103–104 preferably include the following:

Number of page accesses per unit of time. This data serves as a rough measurement of how busy the local server 103–104 is and how much demand there is for its services.

Durations of delays between receipt of client requests for data and the server responses thereto. This data is a measure of the quality of service provided by a server 103–104 and the load being placed by clients 101–102 on that server 103–104.

Number of accesses to each page from each page (referring page) that refers to the accessed page. This data is indicative of how (by what route) clients reach the accessed page and what the sources of accesses to the accessed page are. For example, an advertiser would wish to know this information in order to determine on what (referring) pages it is most effective to advertise its home (accessed) page.

Number of page accesses per browser type. This data indicates what browsers are most likely to be used to access the accessed page. For example, an information provider would wish to know this information in order to structure and adapt the accessed page for the particular capabilities or idiosyncrasies of the most commonly-used browser type or types.

Processor and mass-storage occupancy of the server. This data indicates whether the load being placed upon the server is so high that the server hardware needs to be upgraded.

Configuration details of each accessing browser: browser type, host name, operating system type, etc. This data indicates who the server's clients are, and their characteristics.

Data collected by browser extension 131 on each client 101–102 preferably include the following:

Durations of delays between the client placing a request and a server's response to the request. This data is a measure of the quality of service provided by the server 103–104 as perceived by the user of the client 101–102. When durations of delays between receipt of client requests for data and the server responses thereto (gathered by the server) are subtracted therefrom, this data indicates the delay caused by communications network 105 either on average or for each URL (client address).

Amount of time that a particular object (e.g., a page, a graphical image, an audio clip, an animation, etc.) is active (i.e., is visible, is audible, etc.) at the client. This data indicates how long a user of the client is exposed to the information being provided by that object. For example, an information provider who provides a page of text plus graphics would wish to know that a significant number of users either access the page with graphic capability turned off or move on to other information before display of the graphics is completed.

Abandon count and time. "Abandon" means that the user has either selected "stop" or "open (a new page)", or their equivalent, on their browser before the selected page is returned to the requesting client. This data indicates how long users are willing to wait for receipt of the requested information before they change their mind and move on. When considered along with the durations of delays between clients placing requests and the server's responses thereto, this data indicates whether the timeliness of service being provided meets user expectations.

Click-ahead count and time. "Click-ahead" means selecting a link to another page or object before the page that is being accessed has been completely presented (e.g., displayed) to the user. This data is indicative of how often, and how long after accessing a page, the user found desired information before the page was displayed in full. For example, an advertiser would wish to know that many users are finding the desired information before being exposed to advertising, so that it could reposition the advertising within the page.

Client demographics: time zone, locale, electronic cash balance in their electronic wallet, type of client hardware, etc. This data allows the information provider to evaluate the source and quality of its customers, and tailor its information service accordingly.

Each client's browser extensions 131 may collect the above data automatically for all accesses made by their client 101–102, and may periodically distribute to each server 103–104 that was accessed by their client 101–102 the data that is pertinent to that server 103–104. Preferably, however, each client's browser extensions 131 collect the data that is pertinent to a server 103–104 only in response to a request received from that server 103–104. Illustratively, a server 103–104 that wants to collect management-related data from clients 101–102 includes in its main (home) page a request to browsers 130 to collect service management data. The request specifies the pages for which the data is to be collected; the pages may all be on the requesting server or they may be distributed across a plurality of servers. The request also specifies the URL (i.e., identifies the server) to which the collected data is to be sent by the requested browser 130. This request is used by extensions 131 of the requested browser 130 as the impetus to start collecting the requested data in service management data file 132. Depending on the implementation, browser 130 may or may not obtain its user's permission before honoring a data-collection request. When the data has been collected, extensions 131 cause their client 101–102 to contact and transfer the data to the URL specified in the request. The data transfer may be done periodically, e.g., every half-hour that browser 130 is executing on a client 101–102 and has data in file 132 to send to the requesting server 103–104. Alternatively, the data transfer may be done only in response to certain events, such as the browser 130 ending its accesses to the requesting server 103–104 or to the information service for which the requesting server 103–104 is gathering data.

Alternatively, extensions 131 need not be permanently included in clients 101–102. Rather, extensions 131 may be included in the server requests to clients to collect service management data. Such extensions 131 are then installed on a client by a capability, such as the Microsoft Corp. Active X capability that enables browser 130 to attach "add-ons" to itself, or the Netscape Corp. "plug-ins" capability that enables browser 130 to attach "plug-ins" to itself. "Add-ons" or "plug-ins" are applets, scripts, or other programs that can be added to browser 130 to enhance its capabilities. Given such an implementation of extensions 131, upon receipt of the request to collect service-management data, the receiving browser 130 attaches to itself the received "add-on" or "plug-in" that implements extensions 131, and executes it.

FIG. 2 shows an illustrative example of operations performed by client 101 and server 103 that are relevant to the invention. Service management system 122 of server 103 begins to gather local management data on server 103 in service management database 123, at step 200, when server 103 is brought on line, and continues to do so thereafter. When browser 130 of client 101 sends a request to server 103 to access the home page of an information system served by server 103, at step 202, server 103 receives the request, at step 204, and returns the requested home page to client 101, at step 206. The requested home page contains a management-data-gathering request to client 101. Client 101 receives the home page with the request, at step 208, and in response to the request, browser extensions 131 start gathering local management data on client 101 in service management data file 132, at step 210, and continue to do so while client 101 is accessing the information system served by server 103. When browser 130 of client 101 ends accessing the information system served by server 103, at step 212, browser extensions 103 stop gathering local management data, at step 214, and transfer the gathered data from service management data file 132 to the URL (the address) that was specified in the data-gathering request received at step 208, at step 216. Assuming that the URL identifies server 103, server 103 receives the transferred data from client 101, at step 218, and service management system 122 stores the transferred data in service management database 123, at step 220. Periodically, or upon request of the service manager, service management system 122 uses both the data locally gathered by it as well as the data gathered by and received from client 101 and other clients 102 and possibly even other servers 104 to generate reports for the service manager, at step 222.

Of course, various changes and modifications to the illustrative embodiment described above will be apparent to those skilled in the art. For example the information network need not be the Internet, but may be an intranet or any other type of client/server network. Also, the data gathering function on the clients need not be implemented by browsers, but may be implemented by any program that accesses data, with or without the user being present. Furthermore, a client can be in contact with a plurality of servers simultaneously (e.g., have a plurality of windows from different browsers active simultaneously) and hence can be gathering management data simultaneously for the plurality of servers. Yet further, management data different from or additional to that which was illustratively described may be gathered, and the data can be used for different or additional purposes than those which were given as examples. Such changes and modifications can be made without departing from the spirit and the scope of the invention and without diminishing its attendant advantages. It is therefore intended that such changes and modifications be covered by the following claims.

The invention claimed is:

1. An information network comprising:
   a client machine for making requests for information from an information service;
   a server machine connected to the client machine for providing the information service by supplying requested said information to the client machine;
   a first management data-gathering arrangement associated with the server machine for gathering, on the server machine, management data on interactions between the server machine and the client machine during real use of the network for managing the information service and also gathering management data reported to the first management data-gathering arrangement from the client machine; and
   a second management data-gathering arrangement associated with the client machine for gathering, on the client machine, management data on interactions between the server machine, the client machine, and a user of the client machine during real use of the network for managing the information service and reporting the gathered management data to the first management data-gathering arrangement.

2. The network of claim 1 wherein:
   the client machine comprises browser software executing on the client machine; and
   the second management data-gathering arrangement comprises
   software associated with the browser software and executing on the client machine.

3. The network of claim 1 wherein:
   the second management data-gathering arrangement comprises
   software supplied to the client machine along with the requested information and executing on the client machine.

4. The network of claim 1 wherein:
   the management data gathered by the second management-data-gathering arrangement comprise at least one of: (a) delay between the client machine requesting the information and receiving the requested information, (b) an amount of time that an object of the supplied information is active on the client machine, (c) an abandon count and time of an object of the supplied information on the client machine, (d) a click-ahead count and time of an object of the supplied information on the client machine, and (e) demographics of a user of the client machine.

5. The network of claim 4 wherein:

the management data gathered on the server machine by the first management data-gathering arrangement include at least two of: (f) page accesses per unit of time, (g) delay between receipt of the client machine request for the information and the supplying of the requested information, (h) number of accesses to a page accessed by the client machine from each referring page, (i) a number of page hits per type of browser of the client machine, (j) occupancy of a processing unit and a mass storage unit of the server machine, and (k) configuration data of the browser of the client machine.

6. A management data-gathering system for use with a server machine in an information network wherein a client machine makes requests for information from an information service and the server machine provides the information service by supplying requested said information to the client machine, and the client machine gathers on itself management data on interactions between the server machine, the client machine, and a user of the client machine during real use of the network for managing the information service and reports the gathered management data to the management data-gathering system, the management data-gathering system comprising:

means for gathering, on the server machine, management data on interactions between the server machine and the client machine during real use of the network for managing the information service; and means for gathering the management data gathered on the client machine and reported by the client machine.

7. The system of claim 6 wherein:

the means for gathering management data on the server machine gather at least two of: (a) page accesses per unit of time, (b) delay between receipt of the client machine request for the information and the supplying of the requested information, (c) number of accesses to a page accessed by the client machine from each referring page, (d) a number of page hits per type of browser of the client machine, (e) occupancy of a processing unit and a mass storage unit of the server machine, and (f) configuration data of the browser of the client machine.

8. The system of claim 7 wherein:

the means for gathering the management data gathered on and reported by the client machine gather at least one of: (g) delay between the client machine requesting the information and receiving the requested information, (h) an amount of time that an object of the supplied information is active on the client machine, (i) an abandon count and time of an object of the supplied information on the client machine, (j) a click-ahead count and time of an object of the supplied information on the client machine, and (k) demographics of a user of the client machine.

9. A management data-gathering arrangement for use with a client machine in an information network wherein the client machine makes requests for information from an information service and a server machine provides the information service by supplying requested said information to the client machine, and wherein a management data-gathering system associated with the server machine gathers on the server machine management data on interactions between the server machine and the client machine during real use of the network for managing the information service, the arrangement comprising:

means for gathering, on the client machine, management data on interactions between the server machine, the client machine, and a user of the client machine during real use of the network for managing the information service; and means for reporting the management data gathered on the client machine to the management data-gathering system.

10. The arrangement of claim 9 for use with the client machine which comprises browser software executing on the client machine, wherein:

the arrangement comprises software associated with the browser software and executing on the client machine.

11. The arrangement of claim 9 wherein:

the arrangement comprises software supplied to the client machine along with the requested information and executing on the client machine.

12. The arrangement of claim 9 wherein:

the means for gathering gather at least one of: (a) delay between the client machine requesting the information and receiving the requested information, (b) an amount of time that an object of the supplied information is active on the client machine, (c) an abandon count and time of an object of the supplied information on the client machine, (d) a click-ahead count and time of an object of the supplied information on the client machine, and (e) demographics of a user of the client machine.

13. A management data-gathering system for use with a server machine in an information network wherein a client machine makes requests for information from an information service and the server machine provides the information service by supplying requested said information to the client machine, the system comprising:

an arrangement for gathering, on the server machine, management data on interactions between the server machine and the client machine during real use of the network for managing the information service, the data including at least two of: (a) page accesses per unit of time, (b) delay between receipt of the client machine request for the information and the supplying of the requested information, (c) number of accesses to a page accessed by the client machine from each referring page, (d) a number of page hits per type of browser of the client machine (e) occupancy of a processing unit and a mass storage unit of the server machine, and (f) configuration data of the browser of the client machine; and a storage arrangement for storing the gathered management data.

14. The system of claim 13 further for use with the client machine which gathers on itself management data for managing the information service and reports the gathered management data to the system, the system further comprising:

means for gathering the management data gathered on the client machine and reported by the client machine, for storage by the storage arrangement.

15. The system of claim 14 wherein:

the data gathered by the gathering means include at least one of: (g) delay between the client machine requesting the information and receiving the requested information, (h) an amount of time that an object of the supplied information is active on the client machine, (i) an abandon count and time of an object of the supplied information on the client machine, (j) a click-ahead count and time of an object of the supplied information on the client machine, and (k) demographics of a user of the client machine.

16. A method of gathering management data for managing an information service in an information network that comprises a client machine that makes requests for information from the information service and a server machine that provides the information service by supplying requested said information to the client machine, comprising the steps of:

gathering, on the server machine, some of the management data on interactions between the server machine and the client machine during real use of the network for managing the information service, in a management data-gathering system;

gathering, on the client machine, other of the management data on interactions between the server machine, the client machine, and a user of the client machine during real use of the network for managing the information service;

reporting the gathered other management data to the management data-gathering system; and gathering the reported other management data in the management data-gathering system.

17. The method of claim 16 wherein:

the step of gathering other of the management data comprises the step of gathering on the client machine at least one of: (a) delay between the client machine requesting the information and receiving the requested information (b) an amount of time that an object of the supplied information is active on the client machine, (c) an abandon count and time of an object of the supplied information on the client machine, (d) a click-ahead count and time of an object of the supplied information on the client machine, and (e) demographics of a user of the client machine.

18. The method of claim 17 wherein:

the step of gathering some of the management data comprises the step of gathering on the server machine at least two of: (f) page accesses per unit of time, (g) delay between receipt of the client machine request for the information and the supplying of the requested information, (h) number of accesses to a page accessed by the client machine from each referring page, (i) a number of page hits per type of browser of the client machine, (j) occupancy of a processing unit and a mass storage unit of the server machine, and (k) configuration data of the browser of the client machine.

\* \* \* \* \*